R. KRONENBERG.
METHOD OF MANUFACTURING METAL FELLIES.
APPLICATION FILED OCT. 30, 1917.

1,254,411. Patented Jan. 22, 1918.

Inventor
R. Kronenberg
by G. Dittmar
Attorney

UNITED STATES PATENT OFFICE.

RUDOLF KRONENBERG, OF OHLIGS, GERMANY.

METHOD OF MANUFACTURING METAL FELLIES.

1,254,411.  Specification of Letters Patent.  Patented Jan. 22, 1918.

Application filed October 30, 1917. Serial No. 199,387.

*To all whom it may concern:*

Be it known that I, RUDOLF KRONENBERG, a subject of the King of Prussia, German Emperor, residing at Ohligs, in the Province of the Rhine, Germany, post-office address Wilhelmstrasse 39, have invented certain new and useful Improvements in Methods of Manufacturing Metal Fellies, of which the following is a specification, reference being had therein to the accompanying drawing.

My invention relates to an improved method of manufacturing metal-fellies with upturned electrically welded flanges, which fellies are to be used on bicycles and other wheels, of automotive and any other cars, carriages and vehicles.

The object of my invention is to prevent the welding-metal employed from adhering to the electrical rolls and from spattering out between said rolls, thereby covering not only said rolls, but also the metal-bar to be welded. Such adhering and covering welding-metal not only is objectionable in the working order of the welding process, but it also spoils the neat appearance of the felly. But particularly the spattered welding-metal adhering to the working rolls or electrodes prevents said rolls from properly and neatly forming the welding seams of the flanges.

It has been tried before to overcome the difficulties described above by cooling the electrodes, but the results have failed to give satisfaction.

In carrying my invention into practice, I also apply a cooling method, which is performed by making use of the circumstance, that the flange to be welded to the main or central portion of the felly forms by itself a kind of gutter or channel which, in front and in the rear of the welding rolls is closed by the guiding rollers in front and the molding rollers in the rear of the welding rolls. Into said gutter or channel I introduce a cooling fluid, such as water, which continually fills the same. Owing to such cooling methods it has been experienced that the undue adherence of the welding-metal to the welding rolls as well as the spattering of said welding-metal has been fully done away with; the welding seam obtained is faultless, no interruptions in working are occasioned and the fellies come forth in a perfectly clean and neat state.

Figure 1:
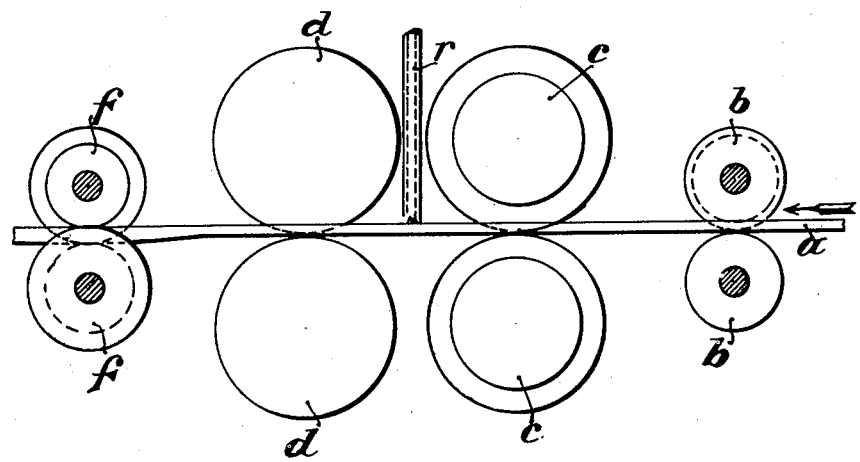

To make my invention perfectly understood, I have illustrated the means of performing the improved method, as an example, in the accompanying drawings, in which:

Figure 1 is a diagrammatical side elevation and

Figure 2:
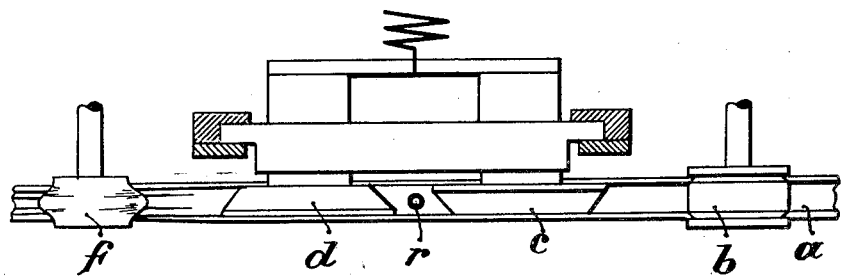

Fig. 2 a plan view of the welding tools employed.

The gutter- or channel-shaped length $a$ of the felly is made to run, first, between the guiding rollers $b$, $b$, then between the pair of electrodes or electrical rolls $c$, $c$, then between another pair $d$, $d$, of such electrodes, and, finally, between the molding rollers $f$, $f$. The length $a$ of the bar to be welded forms, owing to its upturned side-flanges, a gutter or channel between the guiding rollers $b$, $b$, and the molding rollers $f$, $f$, which close the channel in front and in the rear of the electrodes. Into said channel I introduce a cooling fluid, such, for instance, as water, the feeding of which may be performed through a pipe $r$, which keeps the channel permanently filled, as there is no escape between the two ends $b$, $b$, and $f$, $f$. By such means a considerable length of the bar $a$ is subjected to cooling.

I claim as my invention:

An improved method of manufacturing metal-fellies with upturned, electrically welded flanges, consisting in filling a cooling fluid into the channel-shaped space before and behind the electrodes, said intermediate space being closed against the escape of the cooling fluid by the guiding rollers in front and by the molding rollers in the rear of said electrodes.

In testimony whereof I affix my signature in the presence of two witnesses.

RUDOLF KRONENBERG.

Witnesses:
  M. KERSHCINALS,
  R. DE GALZUSTA.